United States Patent
Pallot et al.

(10) Patent No.: US 10,967,679 B2
(45) Date of Patent: Apr. 6, 2021

(54) TIRE WITH A TREAD HAVING REINFORCED SECTORS AND SELF-MAINTAINING RECESSES

(71) Applicant: COMPAGNIE GENERALE DES ETABLISSEMENTS MICHELIN, Clermont-Ferrand (FR)

(72) Inventors: Patrick Pallot, Clermont-Ferrand (FR); Bertrand Daval, Clermont-Ferrand (FR); Benjamin Levrard, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 370 days.

(21) Appl. No.: 15/767,836

(22) PCT Filed: Oct. 6, 2016

(86) PCT No.: PCT/EP2016/073837
§ 371 (c)(1),
(2) Date: Apr. 12, 2018

(87) PCT Pub. No.: WO2017/067789
PCT Pub. Date: Apr. 27, 2017

(65) Prior Publication Data
US 2018/0304693 A1 Oct. 25, 2018

(30) Foreign Application Priority Data
Oct. 20, 2015 (FR) ........................................ 1559980

(51) Int. Cl.
*B60C 11/00* (2006.01)
*B60C 11/13* (2006.01)

(52) U.S. Cl.
CPC ...... *B60C 11/0066* (2013.01); *B60C 11/0008* (2013.01); *B60C 11/0075* (2013.01);
(Continued)

(58) Field of Classification Search
CPC ......... B60C 11/1392; B60C 2011/0341; B60C 2011/0348; B60C 2011/133; B60C 2011/013
See application file for complete search history.

(56) References Cited

U.S. PATENT DOCUMENTS

| 2,710,042 A | 6/1955 | Gates ............................. 154/14 |
| 4,480,671 A | 11/1984 | Giron ........................ 152/209 R |

(Continued)

FOREIGN PATENT DOCUMENTS

| EP | 0 320 215 B1 | 3/1993 | |
| EP | 0602989 A1 * | 6/1994 | ......... B60C 11/0309 |

(Continued)

OTHER PUBLICATIONS

A.N.Gent and J.D. Walter, The Pnuematic Tire, 2005, National Highway Traffic Safety Administration, U.S. Department of Transportation (Year: 2005).*

*Primary Examiner* — Alison L Hindenlang
*Assistant Examiner* — Debjani Roy
(74) *Attorney, Agent, or Firm* — Venable LLP

(57) ABSTRACT

A tire is provided with a tread that includes first and second sectors and grooves. The second sectors are formed of a rigid reinforcing compound. Each of the first and second sectors has a contact face intended to contact a road surface when the tire is in use. Each groove includes sidewalls and a bottom, and extends from an end of an adjacent contact face. A depth P of each groove is measured in a radial direction between its bottom and a position corresponding to a radial height of the adjacent contact face. At least one of the second
(Continued)

sectors has a contact face that includes a recess having a depth p of less than 2 mm, as measured in a radial direction from a surface of the recess to a position corresponding to a radial height of an adjacent first sector.

14 Claims, 5 Drawing Sheets

(52) U.S. Cl.
CPC ...... *B60C 11/1323* (2013.01); *B60C 11/1346* (2013.01); *B60C 11/1392* (2013.01); *B60C 2011/0025* (2013.01); *B60C 2011/133* (2013.01)

(56) References Cited

U.S. PATENT DOCUMENTS

| | | | |
|---|---|---|---|
| 7,377,300 B2 | 5/2008 | Daval | 152/152.1 |
| 2007/0187013 A1* | 8/2007 | Losi | B60C 11/0306 |
| | | | 152/209.5 |
| 2010/0154948 A1 | 6/2010 | Dahlberg et al. | 152/209.4 |
| 2016/0167440 A1* | 6/2016 | Schweitzer | B60C 11/0075 |
| | | | 152/209.5 |
| 2018/0117972 A1* | 5/2018 | Perrin | B60C 11/0058 |

FOREIGN PATENT DOCUMENTS

| | | |
|---|---|---|
| EP | 1 708 896 B1 | 3/2003 |
| EP | 1 701 854 B1 | 4/2008 |
| GB | 357 419 | 9/1931 |
| JP | H02179508 * | 2/1990 |
| JP | H 08-34205 A | 2/1996 |
| WO | WO 2005/030503 A1 | 4/2005 |

\* cited by examiner

TIRE WITH A TREAD HAVING REINFORCED SECTORS AND SELF-MAINTAINING RECESSES

TECHNICAL FIELD

The present invention relates to tires, and more particularly to a tire, the grip performance of which is improved.

In general, a tire is an object exhibiting symmetry of revolution about an axis of rotation. A tire comprises two beads intended to be mounted on a rim; it also comprises two sidewalls connected to the beads, a crown comprising a tread intended to come into contact with the ground, the crown having a first side connected to the radially outer end of one of the two sidewalls and having a second side connected to the radially outer end of the other of the two sidewalls.

The makeup of the tire is usually described by a representation of its constituent components in a meridian plane, which means to say a plane containing the axis of rotation of the tire. The radial, axial and circumferential directions denote the directions perpendicular to the axis of rotation of the tire, parallel to the axis of rotation of the tire and perpendicular to any meridian plane, respectively. In what follows, the expressions "radially", "axially" and "circumferentially" respectively mean "in a radial direction", "in the axial direction" and "in a circumferential direction" of the tire. The expressions "radially inner or, respectively, radially outer" mean "closer to or, respectively, further away from, the axis of rotation of the tire, in a radial direction". The median plane is a plane perpendicular to the axis of revolution of the tire, positioned axially in such a way as to intersect the surface of the tread substantially mid-way between the beads. The expressions "axially inner or, respectively, axially outer" mean "closer to or, respectively, further away from, the median plane of the tire, in the axial direction".

PRIOR ART

As is known, the tread of a tire is provided with a tread pattern comprising, notably, tread pattern blocks by various main, longitudinal or circumferential, axial or else oblique grooves, the elementary blocks also being able to have various finer slits or sipes. The grooves form channels that are intended to drain off water when running on wet ground; the walls of these grooves also define the edges of the tread pattern blocks; depending on the orientation of the forces to which a running tire is subjected, reference is made to a leading edge of a tread pattern block when the force is oriented towards the centre of the block, the trailing edge of a tread pattern block being the opposite edge.

In order to improve the grip of a tire, and more particularly for grip on dry and wet ground, it is well known to reduce the stiffness or the hardness of the rubber compound forming the tread. This reduction in tread stiffness allows the latter to better match the rough surface of the running surface and thus the actual area of contact with the running surface is increased and the grip performance improved with respect to a tread of which the rubber compound is stiffer.

However, the use of a less stiff tread rubber compound favours deformations of the tread pattern grooves, which may degrade their ability to drain off water.

In order to improve the drainage performance of the tires by stabilizing the tread pattern blocks, document EP 1 708 896 B1 proposes a tire, the grooves of which are edged with stiffer rubber compound than the rubber compound predominantly forming the tread. However, while the stiff compound is, in proportion, sparsely present with respect to the relatively soft rubber compound which is itself intended to promote grip, it was observed that even though the proportion of stiff compound in the contact area of the tire is modest, a significant degradation in grip is noted all the same, under braking conditions or under high axial accelerations, which puts paid to the use of a rubber compound with intrinsically high grip. Another comparable example is proposed in document WO 2005/030503, which according to this document would make it possible to obtain cornering stiffness that is stable with the wear of the tire. Another comparable example is proposed in document JP H 0834205 or else in document GB 357419.

BRIEF DESCRIPTION OF THE INVENTION

One subject of the invention is a tire comprising:
two beads and two sidewalls connected to the beads;
a crown, the crown having a first side connected to the radially outer end of one of the two sidewalls and having a second side connected to the radially outer end of the other of the two sidewalls, the crown comprising a radially outer tread, the tread comprising:
at least one first sector extending axially over a portion of the total width of the tread, extending circumferentially over the entire circumference of the tire, and extending radially to a first sector contact face intended to come into contact with the roadway when the tire is running, said first sector essentially consisting of a base material;
at least one second sector extending axially over a portion of the total width of the tread, extending circumferentially over the entire circumference of the tire, and extending radially to a second sector contact face intended to come into contact with the roadway when the tire is running, said second sector essentially consisting of a reinforcing material, the dynamic shear modulus G* of which is at least two times greater than the dynamic shear modulus G* of the base material;
a plurality of grooves made starting from one of said contact faces intended to come into contact with the roadway when the tire is running, each groove having groove sidewalls and a groove bottom, each groove having a depth P measured along a radial direction between the bottom and said contact face;
characterized in that, on the second sector or on one of the second sectors at least, the second sector contact face comprises a recess having a depth p of less than 2 mm.

Thus, the use of a rubber compound that is relatively soft in order to have high grip, which compound is positioned in first sectors very predominantly over the axial width of the tire, is able to be reconciled with the implantation of rigid reinforcing compound into one or more second sectors. Specifically, at the same height of the base material and of the rigid reinforcing material, the load borne, therefore the pressure between the tread and the ground, depends on the compressive stiffnesses of the two materials. If the reinforcing material is 10 times stiffer than the base material of the tread, the local pressure at the deflection, under the reinforced material, is 10 times greater than the pressure on the rest of the tread. The degree of grip is then linked to the grip of each material weighted by the surface fraction thereof in contact and the pressure applied to each material. The inventors have thus observed that the stiffer the rigid reinforcing material is (and a fortiori the more it is present at the surface), the more detrimental it is to the new grip of the tire, this being in a proportion greater than its proportion present at the contact area of the tread. Moreover, an aggravating factor is that, when materials of different stiffnesses are used, the thermal shrinkage after vulcanization of the tire is different, which results in the rigid reinforcing material protruding at the surface of the tire relative to the base material.

According to one aspect of the invention, the recess, which forms a ledge, that is to say a very shallow groove, makes it possible to obtain what is referred to as a "sacrificial rib". This rib is sacrificial in the sense that, by design, it will slide at the surface of the road in normal use, which will maintain said ledge by a permanent wear of the tire at this location. For other information on the "sacrificial rib" constructive arrangement, the reader may refer to U.S. Pat. No. 4,480,671 shows such a sacrificial rib [see lateral rib 8] proposed for a completely different purpose. A person skilled in the art knows that the difference between the rolling radius in the first sector(s) and the rolling radius perpendicular to the recess of the second sector(s) may be self-supporting during the wear of the tire in normal service.

DESCRIPTION OF THE FIGURES

The subjects of the invention will now be described with the aid of the appended drawing, in which.

DETAILED DESCRIPTION OF THE INVENTION

Figure 1:
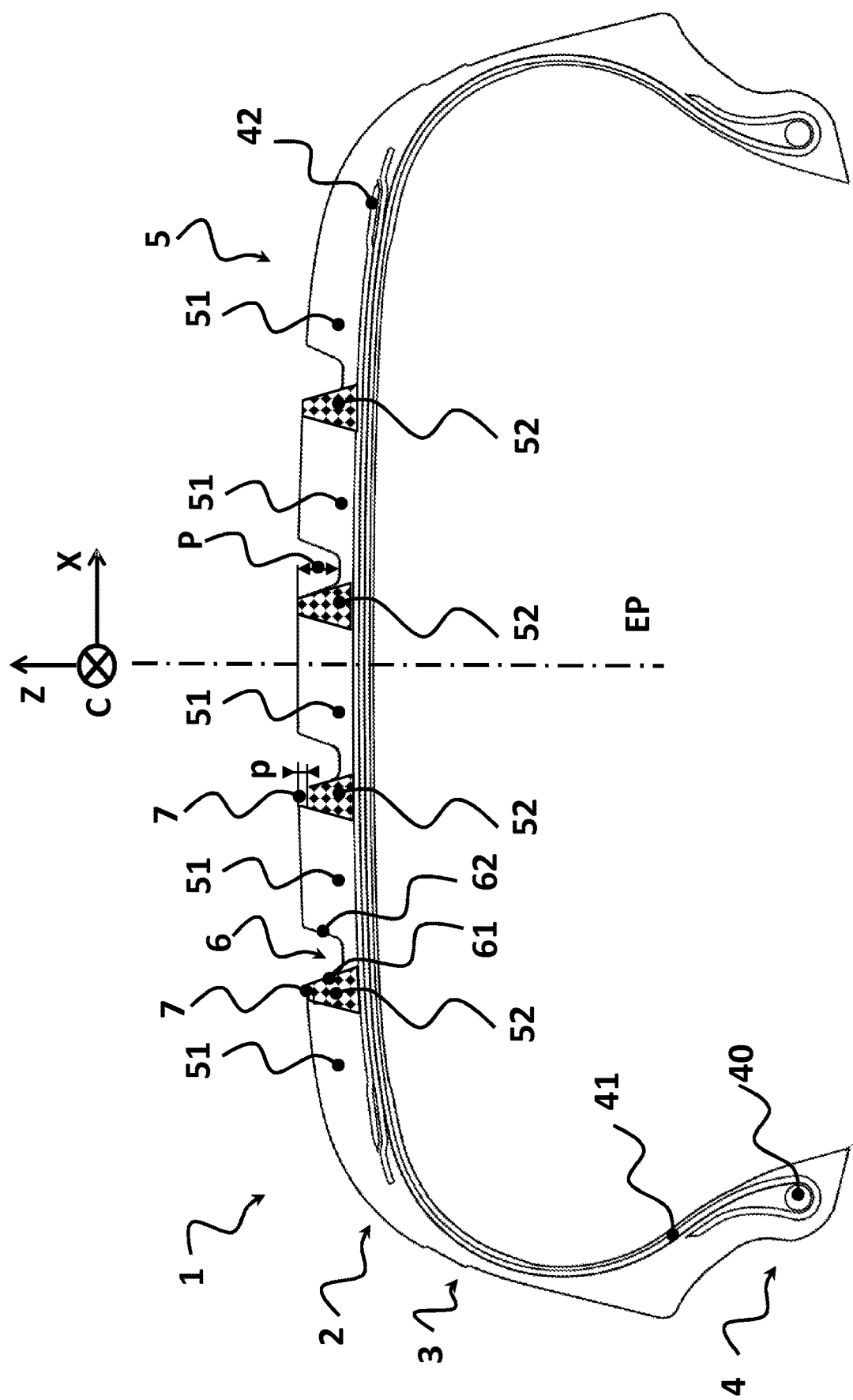
FIG. 1 represents, highly schematically (without being true to a specific scale), a meridional section through a tire in accordance with one embodiment of the invention.

FIG. 1 shows a tire 1 comprising two sidewalls 3 each connected to a bead 4. The tire comprises a crown 2; the crown 2 is connected on each side to the radially outer end of each of the two sidewalls. The crown 2 comprises a tread 5. FIG. 1 indicates an equatorial plane EP, which plane is perpendicular to the axis of rotation of the tire, situated mid-way between the two beads 4 (mounted on rim) and passing through the middle of the belt reinforcement; FIG. 1 also indicates, by arrows placed just above the tread 5, on the equatorial plane EP, the axial X, circumferential C and radial Z directions.

Each bead has a bead wire 40. A carcass ply 41 is wound around each bead wire 40. The carcass ply 41 is radial and is, in a manner known per se, made up of cords; in this implementation, textile cords; these cords are arranged substantially parallel to one another and extending from one bead to the other in such a way that they form an angle of between 80° and 90° with the equatorial plane EP.

The tread 5 essentially consists of a plurality of first sectors 51 and a plurality of second sectors 52. Each first sector extends axially over a portion of the total width of the tread, and extending radially to a second sector contact face intended to come into contact with the roadway when the tire is running. The total, as axially measured width, of the first sectors extends over most of the axial width of the tread. Each first sector essentially consists of a base material, of the type with high grip.

Each second sector 52 extends axially over a small fraction of the total width of the tread; it extends radially to a second sector contact face, it too intended to come into contact with the roadway when the tire is running. It is seen that each second sector is wedge-shaped, the base of which is close to the reinforcing structure of the tire (which reinforcing structure comprises, in a manner known per se, for example, a carcass 41 and a belt 42), and the width of which gradually decreases on moving closer to the surface of the tread. Each second sector essentially consists of a rigid reinforcement material, notably more rigid than the base material.

The first and second sectors 51 and 52 form tread pattern blocks. Two axially adjacent tread pattern blocks are separated by a groove 6. Each groove extends at least partly circumferentially and is delimited axially by groove sidewalls 61 and 62. Each groove 6 has a depth P measured along a radial direction between the bottom of the groove and the contact face of the tread with the ground. Each second sector is wedge-shaped to when seen in meridional section; during rapid running when cornering, each second sector opposes, by its high stiffness in compression and in shear (compared to the first sectors), the shear and the tilting of the tread pattern blocks; this thus makes it possible to retain a large contact area with the running surface, a guarantee of better grip, and this makes it possible to limit the excess pressures on the leading edge of the grooves and thus to limit temperature rises. Preferably, the rigid reinforcing material is visible on at least one of the sidewalls 61 of the grooves 6.

According to the invention, at least one second sector, for example the one or those most stressed in the case of high axial acceleration imposed on the tire or the one most loaded during emergency braking, comprises a recess 7 of very shallow radial depth relative to the tread pattern depth; according to one advantageous embodiment of the invention, the recess 7 having a depth p of less than 2 mm. This makes it possible to obtain a ledge which is relatively close to the equilibrium state of the wear kinetics of the materials, such as the tire will encounter throughout its period of use. Each recess 7 extends at least partly circumferentially, thereby following the orientation of the second sectors.

Figure 2:
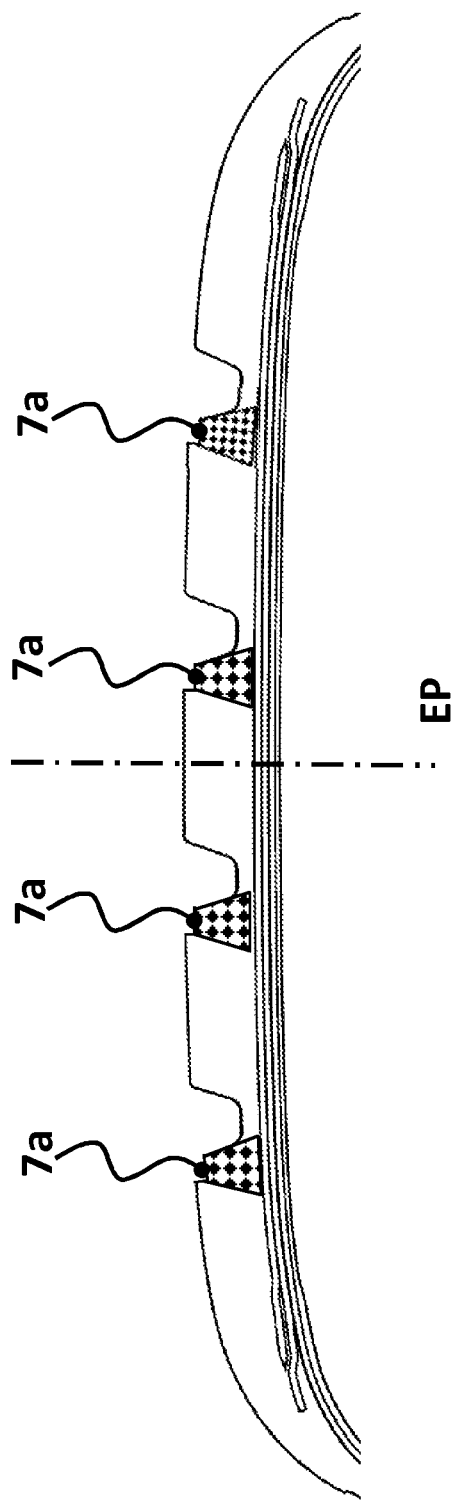
FIGS. 2 to 5 depict treads of tires in accordance with various embodiments of the invention in partial meridional section.
Figure 3:
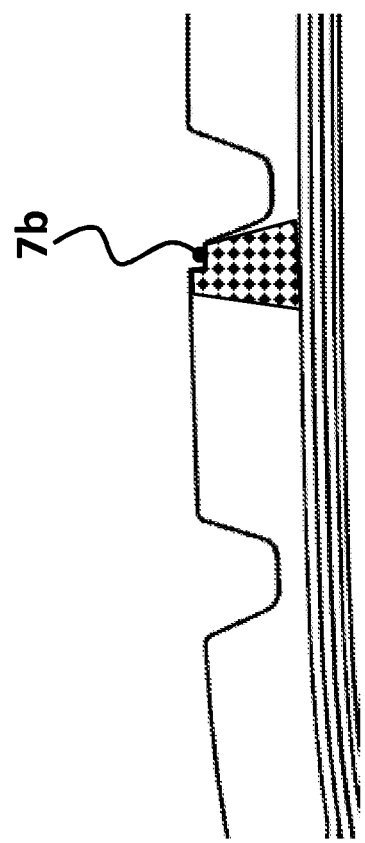
Figure 4:
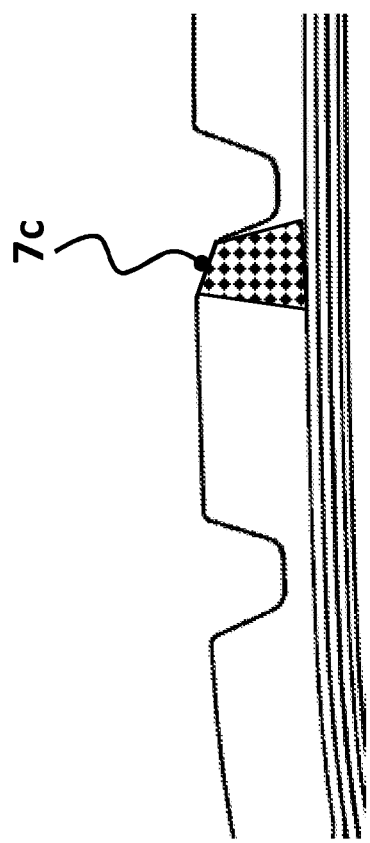
Figure 5:
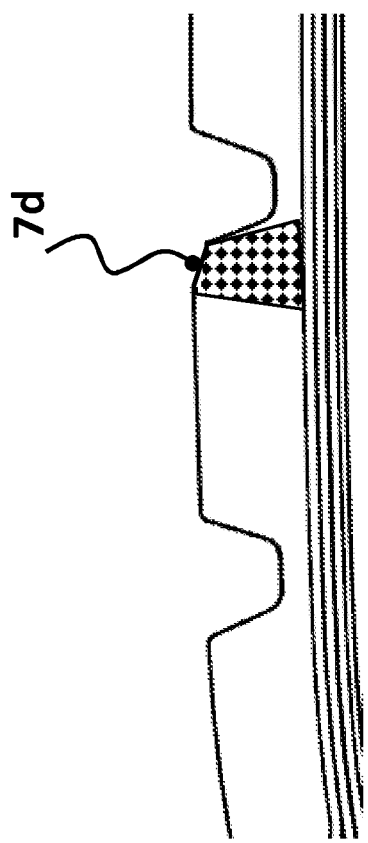

Mention will be made of various embodiment variants. It is seen in FIG. 2 that the recesses 7a are present on all of the second sectors. In FIG. 3 it is seen that the recess 7b only covers a portion of the axial width of the second sector, and not the whole of the axial width thereof. The recesses may have different depths from one second sector to the next. In FIG. 4, it is seen that the recess 7c has an inclined profile relative to the axis of the tire, and in FIG. 5 it is seen that the recess 7d has a profile that is rounded and inclined relative to the axis of the tire. The recess could have a stepped profile or other profile or a combination of various shapes. In other words, it is seen that the recess has an increasing depth p on going axially from one or more first sectors towards one or more second sectors. As a variant, the recess may be present on a portion only of the axial width of the face of the second sectors. Again as a variant, the recess extends axially over the whole of the axial width of the second sectors and over a small portion of the first sectors.

As regards the dimensions, the depth p of the relief is preferably from 0.1 mm to 1.5 mm, and preferentially from 0.2 mm to 0.8 mm.

Preferably, the material of which the tread 5 is made is an elastomer material with a dynamic shear modulus $G^*$, at 60° C. and under a 10 Hz alternating stress of 0.7 MPa, of less than 1.25 MPa. The expression "material of which the tread is made" is understood to mean the material which comprises at least 50% of the volume between the contact area with the ground when new and a level corresponding to 1.6 mm above the bottom of a groove 6 (1.6 mm being the usual height of the tread wear indicators above the bottom of a groove).

In order to produce an elastomer material of which the tread 5 is made that has a dynamic shear modulus G* of 0.9 MPa, reference may be made for example to the formulation below:

TABLE 1 formulation

| Constituent | phr |
|---|---|
| SBR (a) | 100 |
| Silica (b) | 110 |
| Coupling agent (c) | 9 |
| Liquid plasticizer (d) | 20 |
| Resin plasticizer (e) | 50 |
| Black | 5 |
| Zinc oxide | 3 |
| Stearic acid | 2 |
| Antioxidant (f) | 2 |
| Accelerator (g) | 2 |
| DPG | 2 |
| Sulfur | 1 | with:
(a) SBR with 27% stirene, 1,2-butadiene: 5%, cis-1,4-butadiene: 15%, trans- 1,4-butadiene: 80%, Tg = −48° C.
(b) "Zeosil1165MP" silica from Solvay with BET surface area of 160 m²/g
(c) "SI69" TESPT silane from Evonik
(d) "Flexon 630" TDAE oil from Shell
(e) "Escorez 2173" resin from Exxon
(f) "Santoflex 6PPD" antioxidant from Solutia
(g) "Santocure CBS" accelerator from Solutia

TABLE 2

Mechanical properties of the composition after vulcanization

| Property | value |
|---|---|
| Modulus G* (MPa) | 0.9 |
| Tg (° C.) Tanδ max | −10 |

Generally, the second sector essentially consists of a rigid reinforcing material. This may be a fibre-reinforced elastomer compound, as proposed in U.S. Pat. No. 2,710,042 B1 or in patent application US 2010/0145948 A1 or in patent EP 0 320 215 B1. This may be may be an elastomer compound of rigid type. Preferably, the rigid reinforcing material is based on an elastomer material having a dynamic shear modulus G*, measured at 60° C. at 10 Hz and under an alternating stress of 0.7 MPa, of greater than 20 MPa. It is possible to combine the aforementioned embodiments.

As regards the shape of the second sector(s), it may be a wedge shape; this is the example chosen to explain the invention. Alternatively, the second sector(s) may take the form of inserts with a substantially constant axial width that form a skin at the surface of the grooves, as proposed in patent EP 1 701 854 B1. As regards the position in the tread, the reinforced compound may be positioned as a wall of a groove or in the thickness of the tread pattern blocks. The reinforcing second sectors may be independent or connected by a common base formed of the same reinforcing material over all or some of the width of the tread.

Table 3 gives, by way of example, a formulation that makes it possible to obtain a compound with high stiffness:

TABLE 3

| Constituent | C. 1 (in phr) |
|---|---|
| NR (1) | 100 |
| Carbon black (2) | 70 |
| Phenol-formaldehyde resin (3) | 12 |
| ZnO (4) | 3 |
| Stearic acid (5) | 2 |
| 6-PPD (6) | 2.5 |
| HMT (7) | 4 |
| Sulfur | 3 |
| CBS (8) | 2 |

(1) Natural Rubber;
(2) Carbon black N326 (name according to Standard ASTM D-1765);
(3) Phenol-formaldehyde novolac resin ("Peracit 4536K" from Perstorp);
(4) Zinc oxide (industrial grade - Umicore);
(5) Stearin ("Pristerene 4931" from Uniqema);
(6) N-(1,3-Dimethylbutyl)-N'-phenyl-para-phenylenediamine (Santoflex 6-PPD from Flexsys);
(7) Hexamethylenetetramine (from Degussa);
(8) N-cyclohexylbenzothiazole sulfenamide (Santocure CBS from Flexsys).

This combination makes it possible to obtain compounds with high stiffness. The dynamic shear modulus G* measured under an alternating shear stress of 0.7 MPa at 10 Hz and 60 degrees Celsius is 30.3 MPa.

Tests

The reference tire T is known under the trade name Primacy 3, 225/45 R 17 inflated to 2.4 bar. The test is a braking test on wet ground with a water depth of 1 mm. The braking distance is measured between 80 and 10 km/h. The variant V1 is a tire with the same dimension as the control, with the same structure but with a tread having a material with a dynamic shear modulus G* of 0.9 MPa (measured at 10 Hz under an alternating stress of 0.7 MPa). This variant comprises a tread pattern with five ribs separated by four grooves (void ratio of 20%) and relief angles of 5° with no axial notch, with wedge-shaped second sectors made of rigid compound, the formula of which is given above, which are positioned as shown in FIG. 2, except that there is no recess. The variant V2 is in accordance with FIG. 2, with recesses having a depth p of 0.2 mm.

| Performance (in %) | Braking on wet ground 80-10 km/h |
|---|---|
| Tire T | 100 |
| Variant 1 | 127 |
| Variant 2 | 132 |

A 5 point gain in braking distance is observed, a significant gain that enables the use of rigid reinforcing material to be benefited from.

The invention claimed is:

1. A tire having an axis of rotation, the tire comprising:
first and second beads;
first and second sidewalls, the first sidewall being connected to the first bead, and the second sidewall being connected to the second bead; and
a crown including a first side, a second side, and a radially outer tread,
wherein the first side is connected to a radially outer end of the first sidewall,
wherein the second side is connected to a radially outer end of the second sidewall,
wherein the tread includes:
at least one first sector that extends axially over a portion of a total width of the tread, each first sector extending circumferentially over an entire circumference of the tire, each first sector extending radially to a first-sector contact face that is intended to come into contact with a roadway when the tire is running, and each first sector being formed of a base material, at least one second sector that extends axially over a portion of the total width of the tread, each second sector extending circumferentially over the entire circumference of the tire, each second sector extending radially to a second-sector contact face that is intended to come into contact with the roadway when the tire is running, and each second sector being formed of a rigid reinforcing material having a dynamic shear modulus G* that is at least two times greater than a dynamic shear modulus G* of the base material, a plurality of grooves, each groove having groove sidewalls and a groove bottom, each groove sidewall extending from an adjacent contact face, and each groove having a depth P that is measured in a radial direction between its groove bottom and a position corresponding to a radial height of the adjacent contact face, and wherein, for a set of at least one second sector, each contact face of the set includes a recess having a depth p of less than 2 mm, the depth p being measured in a radial direction from a surface of the recess to a position corresponding to a radial height of a contact face of an adjacent first sector, and wherein a rigidity of the reinforcing material is 10 times greater than a rigidity of the base material.

2. The tire according to claim 1, wherein the tread includes a plurality of second sectors, and wherein the set of at least one second sector includes all of the second sectors of the tread, such that every second sector of the tread includes a recess having a depth p of less than 2 mm.

3. The tire according to claim 1, wherein the depth p has a value between 0.1 mm and 1.5 mm.

4. The tire according to claim 1, wherein the depth p has a value between 0.2 mm and 0.8 mm.

5. The tire according to claim 1, wherein the tread includes a plurality of second sectors, wherein each of the second sectors of the tread includes a recess having the depth p of less than 2 mm, and wherein the depth p is different for different recesses of the second sectors.

6. The tire according to claim 1, wherein each recess has an inclined profile relative to the axis of rotation of the tire.

7. The tire according to claim 1, wherein each recess has a curved profile.

8. The tire according to claim 1, wherein each recess has a stepped profile.

9. The tire according to claim 1, wherein each recess has a profile that varies such that the depth p varies in an axial direction from an adjacent first sector towards an adjacent groove.

10. The tire according to claim 1, wherein each recess is present on only a portion of an axial width of a corresponding second sector.

11. The tire according to claim 1, wherein each recess extends axially over an entirety of an axial width of a corresponding second sector, and wherein each recess has a portion positioned radially below an overhanging portion of an adjacent first sector.

12. The tire according to claim 1, wherein the base material includes an elastomer material having a dynamic shear modulus G*, at 60° C. and under a 10 Hz alternating stress of 0.7 MPa, of less than 1.25 MPa.

13. The tire according to claim 1, wherein the reinforcing material includes an elastomer material having a dynamic shear modulus G*, measured at 60° C. and under a 10 Hz alternating stress of 0.7 MPa, of greater than 20 MPa.

14. The tire according to claim 1, wherein the reinforcing material is visible on at least one of the groove sidewalls of each groove.

* * * * *